United States Patent [19]

Geldner

[11] Patent Number: 4,658,414

[45] Date of Patent: Apr. 14, 1987

[54] ROTARY ANODE X-RAY TUBE

[75] Inventor: Ernst Geldner, Weiher, Fed. Rep. of Germany

[73] Assignee: Siemens Aktiengesellschaft, Berlin and Munich, Fed. Rep. of Germany

[21] Appl. No.: 514,004

[22] Filed: Jul. 15, 1983

[30] Foreign Application Priority Data

Sep. 6, 1982 [DE] Fed. Rep. of Germany ....... 3233064

[51] Int. Cl.$^4$ .......................... H01J 35/08; H01J 35/10
[52] U.S. Cl. ..................................... 378/132; 378/143; 378/144
[58] Field of Search ............... 378/125, 127, 130, 131, 378/132, 141, 142, 143, 144; 308/10

[56] References Cited

U.S. PATENT DOCUMENTS

| | | | |
|---|---|---|---|
| 4,167,671 | 9/1979 | Boden et al. | 378/131 |
| 4,322,624 | 3/1982 | Cornelissen et al. | 378/132 |
| 4,417,171 | 11/1983 | Schmitman | 378/131 |
| 4,468,800 | 8/1984 | Friedel et al. | 378/132 |
| 4,468,801 | 8/1984 | Sudo et al. | 378/130 |
| 4,500,142 | 2/1985 | Brunet | 378/132 |

FOREIGN PATENT DOCUMENTS 1595406  8/1981  United Kingdom .

Primary Examiner—Janice A. Howell
Attorney, Agent, or Firm—Hill, Van Santen, Steadman & Simpson

[57] ABSTRACT

A rotary anode X-ray tube has an anode connected at one end of a shaft which is magnetically mounted within the X-ray tube at its opposite end, the shaft simultaneously forming a rotor connected to a drive system for rotating the anode. The X-ray tube housing is formed by a number of connected components, two such components being spaced at opposite ends of the rotor, with the rotor extending therethrough, and each having stop bearings which are normally not in contact with the rotor, but which serve to limit movement of the rotor and the anode connected thereto, in the event of a malfunction in the magnetic mounting. Integration of the anode shaft and the drive rotor enable placement of the stop bearings at locations which minimize the lever action of the rotor-shaft-anode combination thereby significantly improving stability of the total assembly.

4 Claims, 1 Drawing Figure

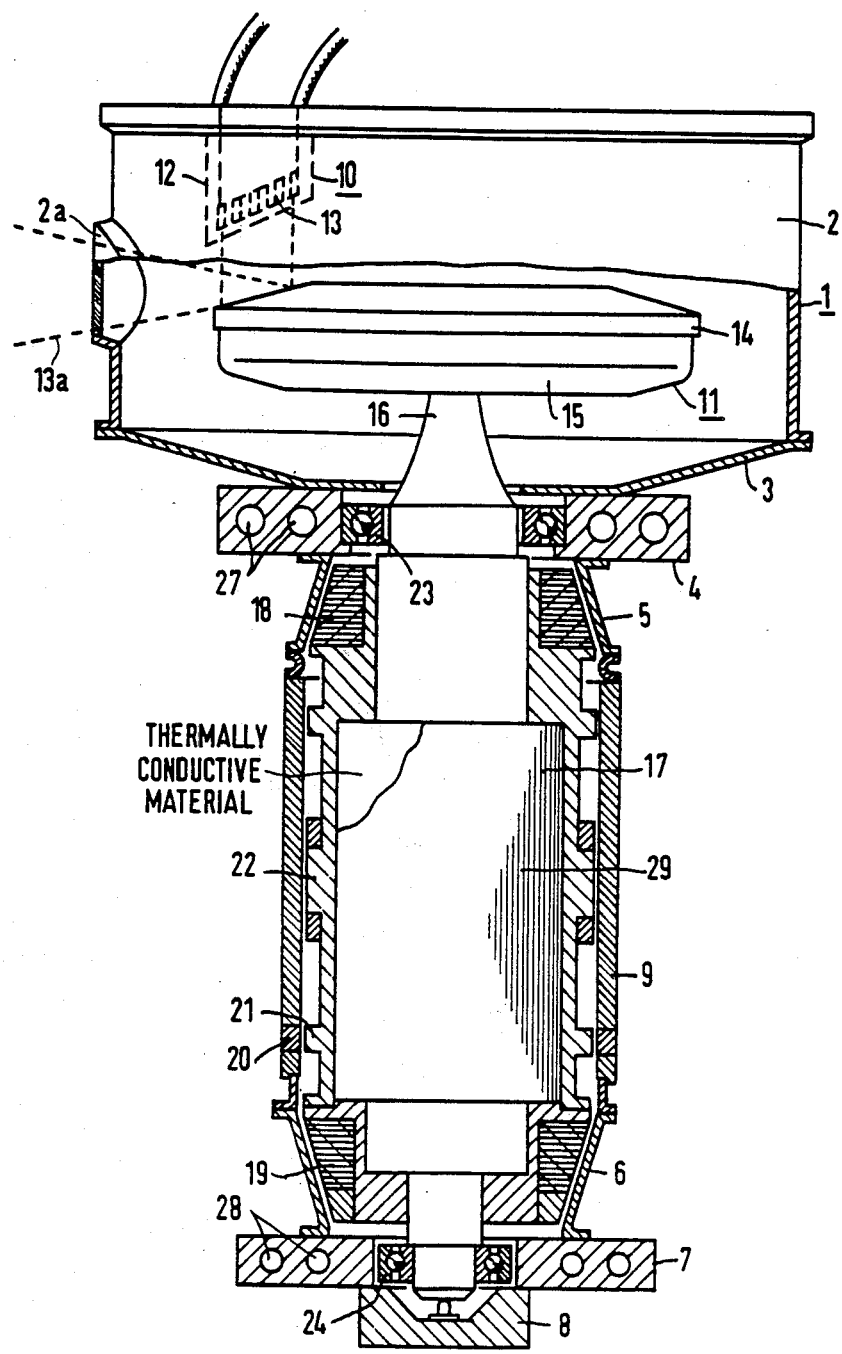

ROTARY ANODE X-RAY TUBE

BACKGROUND OF THE INVENTION

1. Field of the Invention

The present invention relates to rotary anode X-ray tubes, and in particular to such X-ray tubes wherein the anode is connected at one end of a shaft which is magnetically mounted within the X-ray tube at its opposite end.

2. Description of the Prior Art

A rotory anode tube wherein the anode member is mounted at one end of a shaft which is magnetically mounted at its opposite end within the X-ray tube is described, for example, in British Pat. No. 1,595,406. In conventional rotary anode X-ray tubes of this type, the driving connection between the drive means and the anode shaft is effected by means of a cup or sleeve which is in turn rigidily connected to the anode shaft. The sleeve or cup also has at least one stop bearing for emergency support of the shaft in the event of the magnetic mounting means ceasing to operate for the purpose of limiting movement of the anode and shaft so as to avoid impact of the shaft and/or anode against the immobile parts of the X-ray tube.

A problem in the design of emergency support means such as the stop bearings in conventional X-ray tubes is that the bearings provide substantially one-sided support for the anode and shaft resulting in an extremely high torque due to the relatively long lever-arm which must be supported by the stop bearing. This is a particularly acute problem in the case of X-ray tubes exhibiting a high anode rotational speed, in the range of 200 Hz or greater.

SUMMARY OF THE INVENTION

It is an object of the present invention to provide a rotary anode X-ray tube wherein the anode is carried on a magnetically mounted shaft wherein the tube has an emergency support means in the form of stop bearings which substantially eliminate the occurrence of large lever actions of the anode and shaft in the event that the magnetic support means ceases to operate.

The above objects are inventively achieved in an X-ray tube wherein the shaft carrying the anode simultaneously serves as the rotor for the drive system for rotating the anode, and is directly drivingly connected thereto without an intermediate cup or sleeve and wherein the stop bearings are directly mounted in the housing for the X-ray tube with the opposite ends of the rotor-shaft extending therethrough. Thus, should the rotor-anode-shaft combination cease to be supported in a contact-free manner by the magnetic support means, an emergency stable support mounting is still present which intercepts the impact forces as the shaft strikes the stop bearings without exerting a significant bending moment on the shaft. Because the bearings are not disposed on the rotor anode shaft combination, the diameter of the bearings can be enlarged without significant limit so as to accomodate extremely high rotational speeds, i.e., without adding to the mass of the rotor-anode shaft combination. Moreover, under emergency conditions the cushioned rotor mounted at two points at its opposite ends is substantially free of oscillation because the anode member carried at one end thereof, as a "second" load, is dynamically better balanced by means of the bearing adjacent thereto than in conventinal mounting structures wherein two loads, namely the anode and the rotor, are mounted in a bore and supported only at one end resulting in a relatively long "lever" and correspondingly high torque.

Integration or combination of the rotor and the anode shaft moreover makes space available within the structure which can be utilized for heat storage. For this purpose, the rotor may exhibit a cavity which may be filled with material having high thermal capacity, such as copper, carbon, an alloy of sodium and potassium, or the like. Thus the rotor disclosed and claimed herein, in comparison with conventional rotary anode rotors, exhibits increased thermal capacity and conducts a great deal of heat from the anode. Discharge of heat can also be improved by the use of thermally conductive agents such as, for example, a "heat pipe" having a discharge or evacuation direction toward the end of the rotor. Another alternative is to utilize the interior volume of the rotor for developing endothermal reversible chemical reactions.

The emergency support mounting for the rotor employing the stop bearings can be manufactured jointly with the bearings. For this purpose, stable mounting plates may be utilized in which the bearings are disposed, those plates being easily made a part of the X-ray tube housing and being easily connected therewith. A force transmission path from the anode to the closest stop bearing is thus achieved which is so short that bending moments acting on the anode shaft do not occur.

The exterior portions of the plates containing the stop bearings may also be of a selected thickness so as to receive a plurality of bores through which cooling agents can be conducted.

DESCRIPTION OF THE DRAWING

The single figure is a side view, partly in section, of a rotary anode X-ray tube constructed in accordance with the principles of the present invention.

DESCRIPTION OF THE PREFERRED EMBODIMENTS

A rotary anode tube constructed in accordance with the principles of the present invention has a tube envelope 1 consisting of a plurality of connected components. The tube envelope 1 has a generally cylindrical chamber 2 joined to a tapering segment 3. The segment 3 is in turn connected to a plate 4 which is connected to an outwardly tapering segment 5 which is in turn connected to a generally cylindrical segment 9, which is connected to an inwardly tapering section 6. The end of the inwardly tapering section 6 is connected to another plate 7, which is connected to an endpiece 8. The components 2, 3, 4, 5, 6, 7 and 8 are all comprised of metal, and the cylindrical segment 9 is comprised of ceramic material.

The chamber 2 has a cathode assembly 10 therein consisting of a cathode housing 12 and a thermionic cathode 13. The chamber 2 also receives an anode assembly consisting of an anode plate 14 and a graphite member 15 connected thereto at the side thereof facing away from the cathode assembly 10. The cathode assembly 10 emits an electron beam which is incident on the anode assembly 11 for generating an X-ray beam 13a directed through an aperture 2a in the chamber 2.

The anode assembly 11 is centrally connected to a rotary shaft 16 which merges into a rotor 17 which is magentically mounted at 18 and 19 in a contact-free manner. The rotor 17 has an annular rib 21 carried thereon serving as a guide sensor in combination with a bushing 20 for controlling the magnetic bearing of the rotor 17.

The rotor 17 has additional annular metal ribs 22 thereon which interact with the remainder of the drive system (not shown) for rotating the rotor 17.

Stop bearings 23 and 24 are disposed at each end of the rotor 17. The stop bearings 23 and 24 are respectively disposed in the plates 4 and 7 forming a part of the X-ray tube envelope. The plates 4 and 7 can thus be easily interconnected with the other components of the tube envelope.

Moreover, the plates 4 and 7 may include respective channels 27 and 28 through which a cooling agent can be conducted in order to aid in heat transfer during operation of the X-ray tube.

The rotor 17 has an interior cavity 29 which may be filled with a material of high heat capacity such as, for example, copper, carbon, an alloy of sodium and potasium, or the like thus providing further assistance in transferring heat developed by the anode plate 14 away from that component.

Although modifications and changes may be suggested by those skilled in the art it is the intention of the inventor to embody within the patent warranted hereon all changes and modifications as reasonablv and properly come within the scope of his contribution to the art.

I claim as my invention:

1. A rotary anode X-ray tube comprising:
   a housing consisting of a first chamber having an opening therein, a first metal plate adjacent said first chamber and having a central opening therein in registry with said opening in said first chamber, a second chamber having one end closed by said first metal plate, and a second metal plate disposed at and closing an opposite end of said second chamber, said second metal plate having a central opening therein in registry with said central opening in said first metal plate;
   a cathode disposed in said first chamber;
   an anode disposed in said first chamber facing said cathode;
   a rotor disposed in said second chamber and extending through said respective central openings in said first and second metal plates, said rotor having an anode shaft connected thereto with said anode being mounted at an end thereof;
   means for magnetically mounting said rotor in said second chamber at opposite ends thereof; and
   a pair of spaced emergency stop bearings respectively received in said first and second metal plates, said stop bearings normally not in contact with said rotor and being disposed for supporting said rotor at two points in the event of failure of said magnetic mounting means, one of said points being disposed substantially adjacent said anode shaft.

2. A rotary anode X-ray tube as claimed in claim 1 wherein each of said first and second plates has at least one channel extending therethrough for conducting a cooling agent through said plates.

3. A rotary anode X-ray tube as claimed in claim 1 wherein said rotor has a hollow interior cavity containing material having a high thermal capacity for storing heat developed by said anode.

4. A rotary anode X-ray tube as claimed in claim 3 wherein said material of high heat capacity is selected from the group consisting of copper, carbon, or an alloy of sodium and potassium.

* * * * *